United States Patent [19]

Kobayashi et al.

[11] Patent Number: 5,515,822
[45] Date of Patent: May 14, 1996

[54] INTAKE SYSTEM

[75] Inventors: Manabu Kobayashi; Akira Yamaguchi, both of Iwata, Japan

[73] Assignee: Yamaha Hatsudoki Kabushiki Kaisha, Iwata, Japan

[21] Appl. No.: 245,968

[22] Filed: May 19, 1994

[51] Int. Cl.⁶ ............................................. F02M 35/10
[52] U.S. Cl. ................. 123/184.35; 123/184.48; 123/432
[58] Field of Search ............ 123/184.42, 184.31, 123/184.35, 184.48, 432, 308, 184.34

[56] References Cited

U.S. PATENT DOCUMENTS

| | | | |
|---|---|---|---|
| 2,740,389 | 4/1956 | Reyl | 123/184.42 |
| 4,649,876 | 3/1987 | Ohmi et al. | 123/432 |
| 4,766,853 | 8/1988 | Iwanami | 123/432 |
| 4,962,735 | 10/1990 | Andreas | 123/184.31 |
| 5,005,536 | 4/1991 | Suzuki et al. | 123/184.35 |
| 5,048,471 | 9/1991 | Takii et al. | 123/432 |
| 5,056,472 | 10/1991 | Kurokawa et al. | 123/184.35 |
| 5,127,370 | 7/1992 | Suzuki et al. | 123/432 |

FOREIGN PATENT DOCUMENTS

| | | | |
|---|---|---|---|
| 0223373 | 5/1987 | European Pat. Off. | 123/184.31 |
| 4014291 | 11/1991 | Germany | 123/184.35 |
| 60-222523 | 11/1985 | Japan | 123/184.42 |
| 3-9024 | 1/1991 | Japan | 123/184.31 |
| 4-164121 | 6/1992 | Japan | 123/184.31 |

*Primary Examiner*—David A. Okonsky
*Attorney, Agent, or Firm*—Knobbe, Martens, Olson & Bear

[57] ABSTRACT

An induction system for a V-type engine that permits a compact engine configuration and the tuning of two different intake passages for each cylinder for different engine speed ranges. The shorter high-speed intake passages are served by the plenum chamber adjacent the cylinder bank while some of the other intake passages are served by the adjacent plenum chamber and others are served by the other plenum chamber. The second intake passages all have the same length and the configuration is such so as to provide substantially equal flow lengths for the intake air and to substantially preclude adjacent firing cylinders drawing air from the same plenum chamber under at least some running conditions,

62 Claims, 8 Drawing Sheets

INTAKE SYSTEM

BACKGROUND OF THE INVENTION

This invention relates to an intake system and more particularly to an improved induction system for an internal combustion engine.

As is well known, the induction system of an internal combustion engine is extremely important in determining the performance of the engine. Since in many applications, particularly for use in motor vehicles, the engine is required to run over widely varying speed and load ranges, it has been proposed to provide an induction system wherein each cylinder of the engine is served by a pair of intake passages each of which is tuned for a different running condition of the engine. Such an arrangement is shown in U.S. Pat. No. 4,649,876, entitled "Intake Means of Internal Combustion Engine," issued Mar. 17, 1987 in the names of Masatoshi Ohmi, et al., which patent is assigned to the assignee hereof. That induction system is particularly designed for use with V-type engines and includes a pair of plenum chambers each disposed in proximity to one of the cylinder banks. The two intake passages for each cylinder are served respectively by one of the plenum chambers so as to provide a short high-speed intake passage from the adjacent plenum chamber and a longer low-speed intake passage from the plenum chamber associated with the opposite cylinder bank. This arrangement provides extremely good engine performance.

However, the arrangement used therein requires a number of intake passages that extend across the valley between the cylinder banks to the opposite plenum chambers. This adds significantly to the external plumbing of the engine. In addition, this type of induction system generally increases the height requirements of the engine, not always a desirable result.

It is, therefore, a principal object of this invention to provide an improved induction system for an engine that permits tuning of the cylinder to two different speed ranges while at the same time maintaining a minimum amount of external plumbing and a low height.

The amount of external conduitry required can be simplified if not all cylinders of each cylinder bank are served by the plenum chambers of both cylinder banks. However, if one plenum chamber serves both intake passages for the cylinder of the associated cylinder bank, it is somewhat more difficult to provide the different flow lengths to provide the different tuning.

It is, therefore, a further object of this invention to provide an improved induction system for an engine having cylinder banks which reduces the number of external conduits but which permits independent tuning of two intake passages for each cylinder.

If both intake passages of a given cylinder are served by an adjacent plenum chamber or, for that matter, by a plenum chamber disposed on the opposite side of the engine, then a situation may arise wherein the intake pulses from one cylinder adversely effect those of other cylinders. In U.S. Pat. No. 4,809,647, entitled "Intake System for Multi-Cylindered Engine," issued Mar. 7, 1989 in the name of Iwao Matsumoto, et al., assigned to the assignee hereof, there is disclosed an arrangement wherein the cylinders of the engine fire in an order so that no two cylinders will draw from the same plenum chamber on successive firings. This improves the performance of the engine because it ensures that adequate air will be available in each plenum chamber to serve the cylinders.

Such an arrangement is facilitated when each cylinder has both of its intake passages served by a different plenum chamber. However, when one plenum chamber may serve both intake passages of the same cylinder, then it is more difficult to ensure that no two cylinders will draw successively from the same plenum chamber.

It is, therefore, a still further object of this invention to provide an improved induction system for an internal combustion engine having a pair of plenum chambers that serve a multitude of cylinders and wherein the charge is not drawn from one plenum chamber on successive firings of the engine under at least certain running conditions.

As will be noted from the aforenoted United States Letters Patents, the system can be simplified if there is a single atmospheric air inlet that serves both plenum chambers. This eliminates the necessity for separate air cleaner, silencer assemblies for each plenum chamber and also permits the use of a single main throttle valve positioned in the common air inlet. However, this generally requires the inlets to the respective plenum chambers to be located at one end of the engine so as to reduce height and avoid additional complexity of the intake plumbing. However, when the air is introduced into the plenum chamber at one of its ends, then different air flow lengths occur between the inlet and the various cylinders served by them. This can cause some cylinder to cylinder variation.

It is, therefore, a still further object of this invention to provide an improved induction system for a plenum chamber that serves a multiple number of cylinders and which has its inlet at one end but which minimizes the difference of the flow lengths between the inlet and the individual cylinders served thereby.

The problem of maintaining a low hoodline has already been mentioned in conjunction with induction systems of this type. By positioning the plenum chambers over the cylinder heads of the engine, the height of the induction system is increased. Where the engine is positioned transversely in the engine compartment, a common practice with certain types of vehicles such as front engine, front wheel drive or rear engine, rear wheel drive vehicles, the desire of providing a sloping hood can be complicated by this type of induction system.

It is, therefore, a still further object of this invention to provide an induction system of this type which maintains a low engine profile and permits a low sloping hood.

SUMMARY OF THE INVENTION

A first feature of this invention is adapted to be embodied in an induction system for an internal combustion engine having a pair of angularly disposed cylinder banks each having at least two cylinders. First and second plenum chambers are provide each of which is juxtaposed to a respective one of the cylinder banks. A first series of intake passages each extend from one of the cylinders to the adjacent plenum chamber. A second series of intake passages extend from a first number of the cylinders to the adjacent plenum chamber and a third series of intake passages extend from the remaining of the cylinders to the non-adjacent plenum chamber.

Another feature of the invention is also adapted to be embodied in an induction system for an internal combustion engine and in which the engine has a plurality of aligned cylinders. A plenum chamber having an atmospheric inlet at one end thereof is provided and a plurality of intake passages extend from the cylinders into the plenum chamber and open therein at positions spaced along the length of the plenum chamber. Means form an internal duct in the plenum chamber from the atmospheric air inlet to a point in the plenum chamber substantially at the center of the intake passages.

A further feature of the invention is adapted to be embodied in an induction system for a V-type engine having a pair of cylinder banks that are disposed at a V angle to each other. The cylinder banks each have cam covers associated therewith with the upper surfaces of the cam covers lying at acute angles to a horizontal plane perpendicular to a vertical plane bisecting the cylinder banks. A pair of plenum chambers each extend along the upper surface of a respective one of the cam covers and have lower surfaces that extend substantially parallel to the upper surfaces of the cam covers for maintaining a low profile of the engine. Intake passages extend from the cylinders into the plenum chambers for delivering a charge to the cylinders.

DESCRIPTION OF THE PREFERRED EMBODIMENTS

Figure 1:
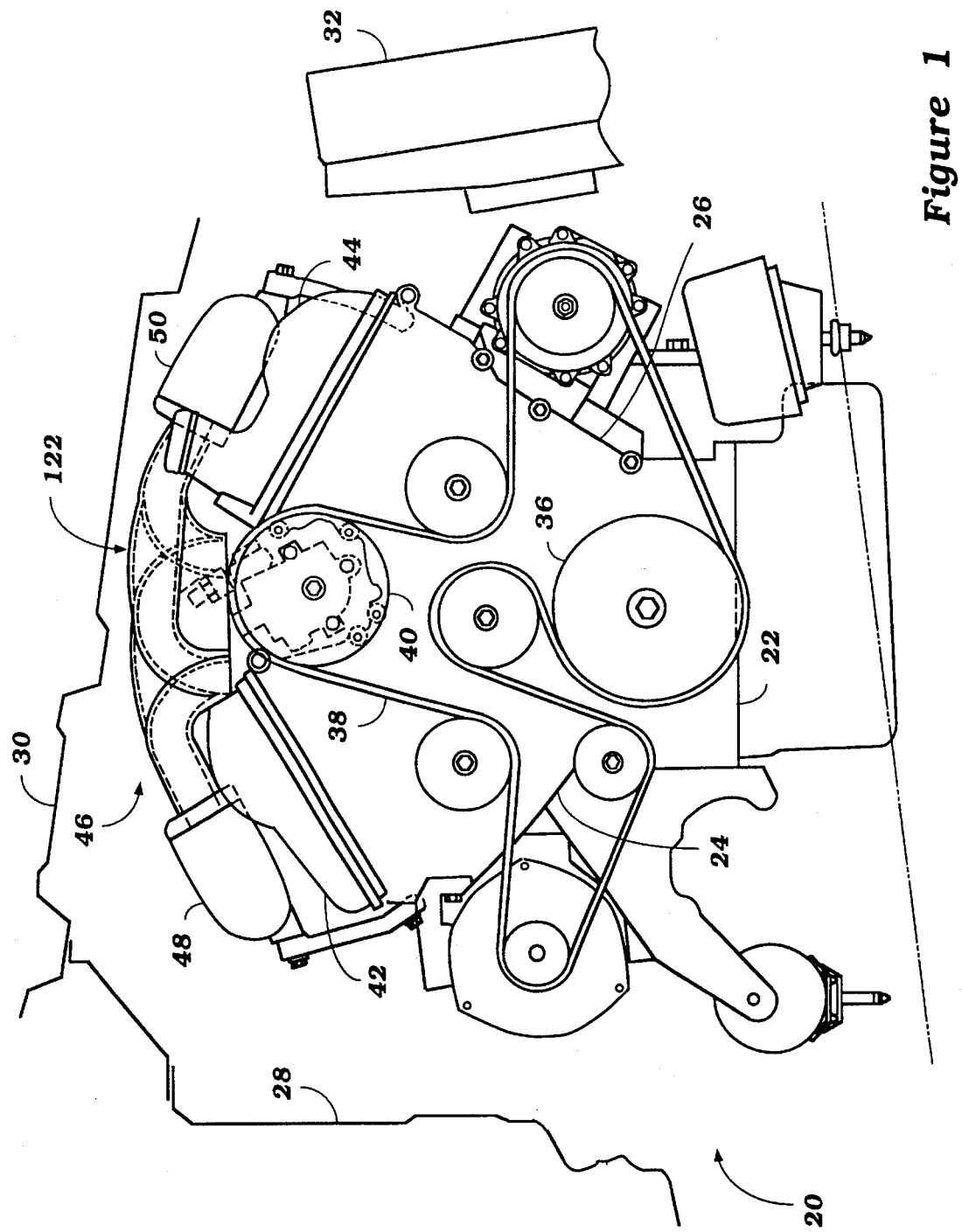
FIG. 1 is a front elevational view of an internal combustion engine constructed in accordance with an embodiment of the present invention.

In the drawings the reference numeral 20 indicates generally an internal combustion engine constructed in accordance with an embodiment of the present invention. The engine 20 is of the V-type and includes a cylinder block 22 having angularly inclined banks 24 and 26. In the illustrated embodiment, the engine 20 is of the V8-type, and each cylinder bank 24, 26 defines four cylinder bores, as will be described. The cylinder bores of the bank 24 are disposed at an angle to those of the bank 26, and in the illustrated embodiment, this angle is 60 degrees. It is to be understood, however, that the invention and certain facets of it are useful with engines of other configurations and engines in which the angle between the banks is other than 60 degrees. The invention, however, has particular utility in conjunction with V-type engines, and particularly those in which a very narrow or relatively shallow cylinder bank angle is employed.

Figure 2:
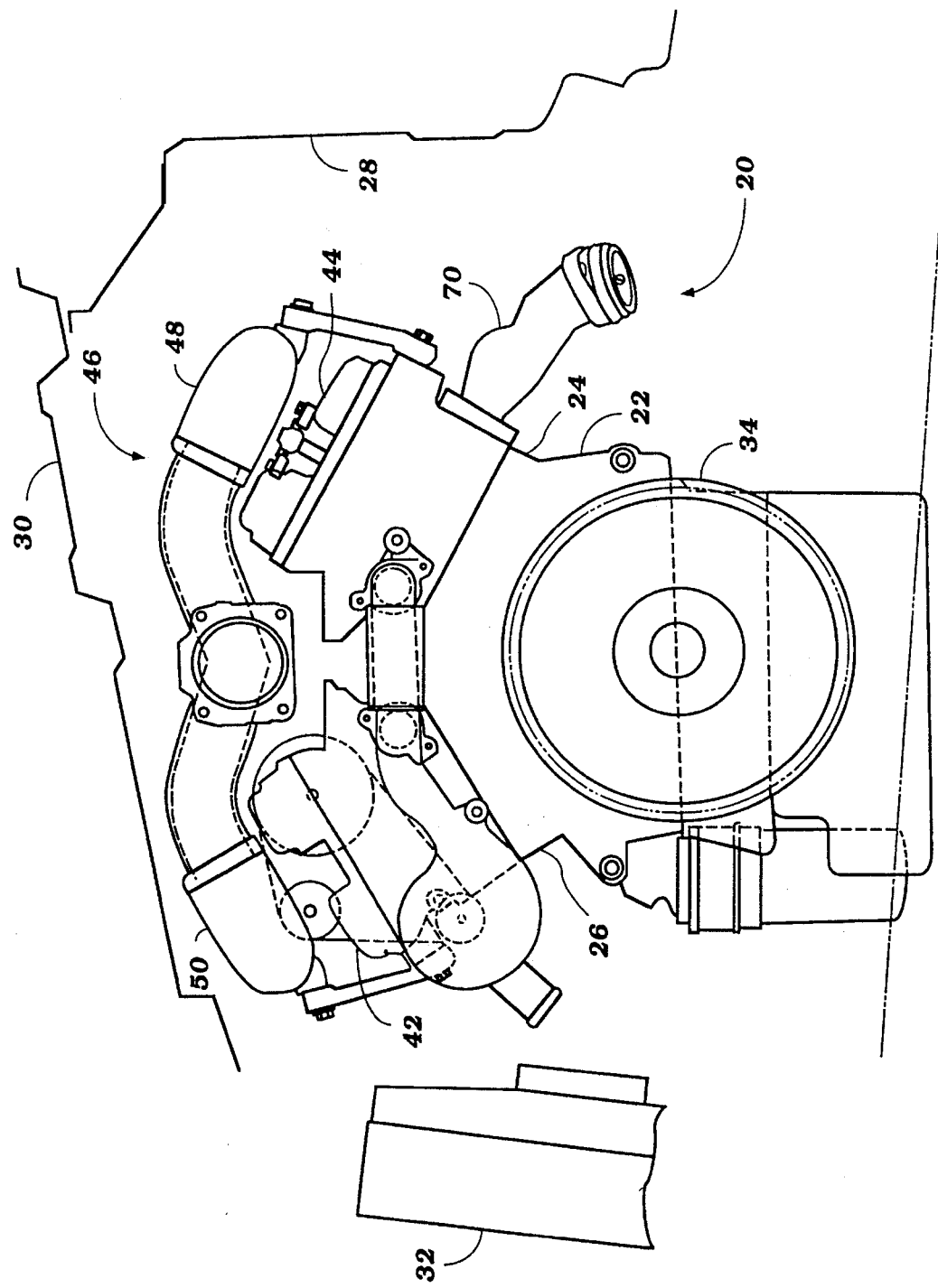
FIG. 2 is a rear elevational view of the internal combustion engine of FIG. 1.

FIG. 1 and FIG. 2, which are front and rear views of the engine 20, respectively, illustrate the 60-degree divergence of the cylinder banks 24, 26. The engine 20 is shown mounted transversely within an engine compartment, generally shown at 28, and under a sloped engine hood 30. A radiator 32, situated adjacent the engine 20, is located at the forward end of the vehicle in which the engine is situated. Within the engine block 22, the engine journals a crankshaft on which a flywheel 34 (FIG. 2) and a drive pulley 36 (FIG. 1) are keyed. One or more belts 38 extend around the drive pulley 36 and around a plurality of engine pulleys, one of which being a fuel pump pulley 40, described in more detail below. A pair of angled cam covers 42, 44 are sealingly mounted on a top surface of each cylinder bank 24, 26. The cam covers 42, 44 generally lie perpendicular to outwardly diverging lines through each cylinder bank 24, 26. Because of this arrangement, if the engine 20 is oriented so that each cylinder bank 24, 26 makes a 30-degree angle with a central bisecting vertical plane, each cam cover 42, 44 makes approximately a 30-degree angle with a horizontal plane.

Figure 3:
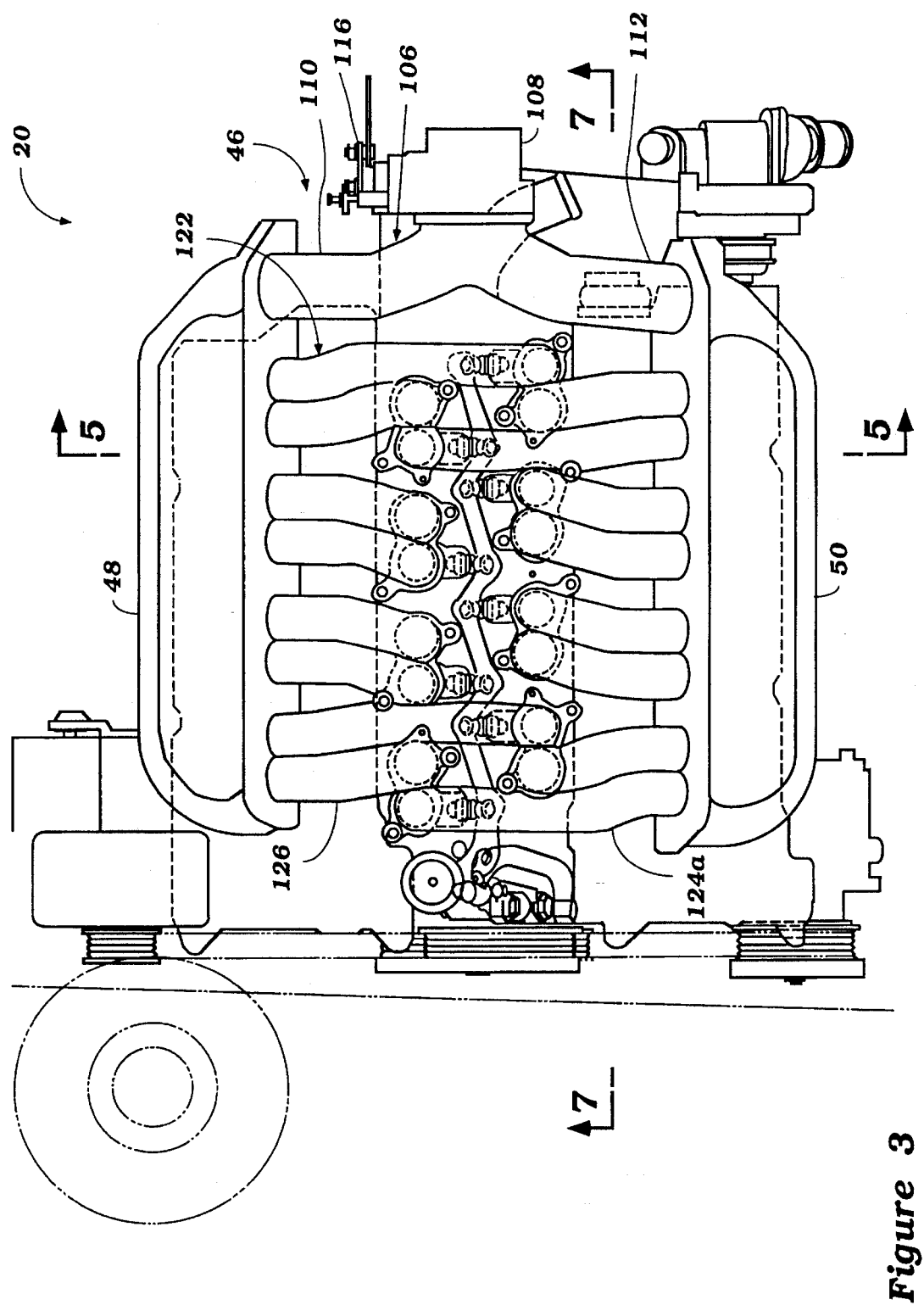
FIG. 3 is a top plan view of the internal combustion engine showing a preferred air intake induction system.

With reference to FIGS. 1–3, the present internal combustion engine 20 incorporates an improved air intake induction system 46 mounted atop the engine. The induction system 46 generally comprises a pair of plenum chambers 48, 50 juxtaposed above each cylinder bank 24, 26, respectively, and a plurality of intake passages, as will be described below. The induction system 46 generally functions to provide a correct air flow to the combustion chambers within the eight cylinders of the engine. The improved design of the induction system 46 allows the associated intake conduit plumbing to be reduced in profile, and thus allows the entire engine 20 to maintain a low profile underneath the hood 30. Specifically, the plenum chambers 48, 50 are arranged so that their lower surfaces lie generally juxtaposed and parallel to the upper surface of each respective cam cover 42, 44. Furthermore, the vertical height of each plenum chamber 48, 50 is reduced, as compared with prior designs, due to the elimination of stacked sub-chambers within.

Prior to a detailed description of the induction system 46, an overview of the relevant internal components of the engine 20 is appropriate. With specific reference to FIGS. 5 and 8, the cylinder bank 24 is provided with four cylinder bores, as has been noted, which are shown as circles in FIG. 8 and are identified by the respective numerals 51–54. In a like manner, the cylinder bank 26 is also formed with four cylinder bores, which are shown as circles and identified by the reference numerals 55–58 in FIG. 8. Pistons 60 are reciprocally supported in each of the cylinder bores 51–58 and are connected to a crankshaft in a known manner, as by means including connecting rods 62.

A cylinder head, indicated generally by the reference numeral 64, is affixed in a known manner to the cylinder bank 24. Similarly, a cylinder head 66 is affixed to the cylinder bank 26. Each cylinder head 64 and 66 has a recess cavity 68 formed therein for each of the cylinder bores. The cavity 68, piston 60, and cylinder bores 51-58 form the combustion chambers of the engine, and the reference numeral 68 will be, at times, referred to as the combustion chambers.

Figure 5:
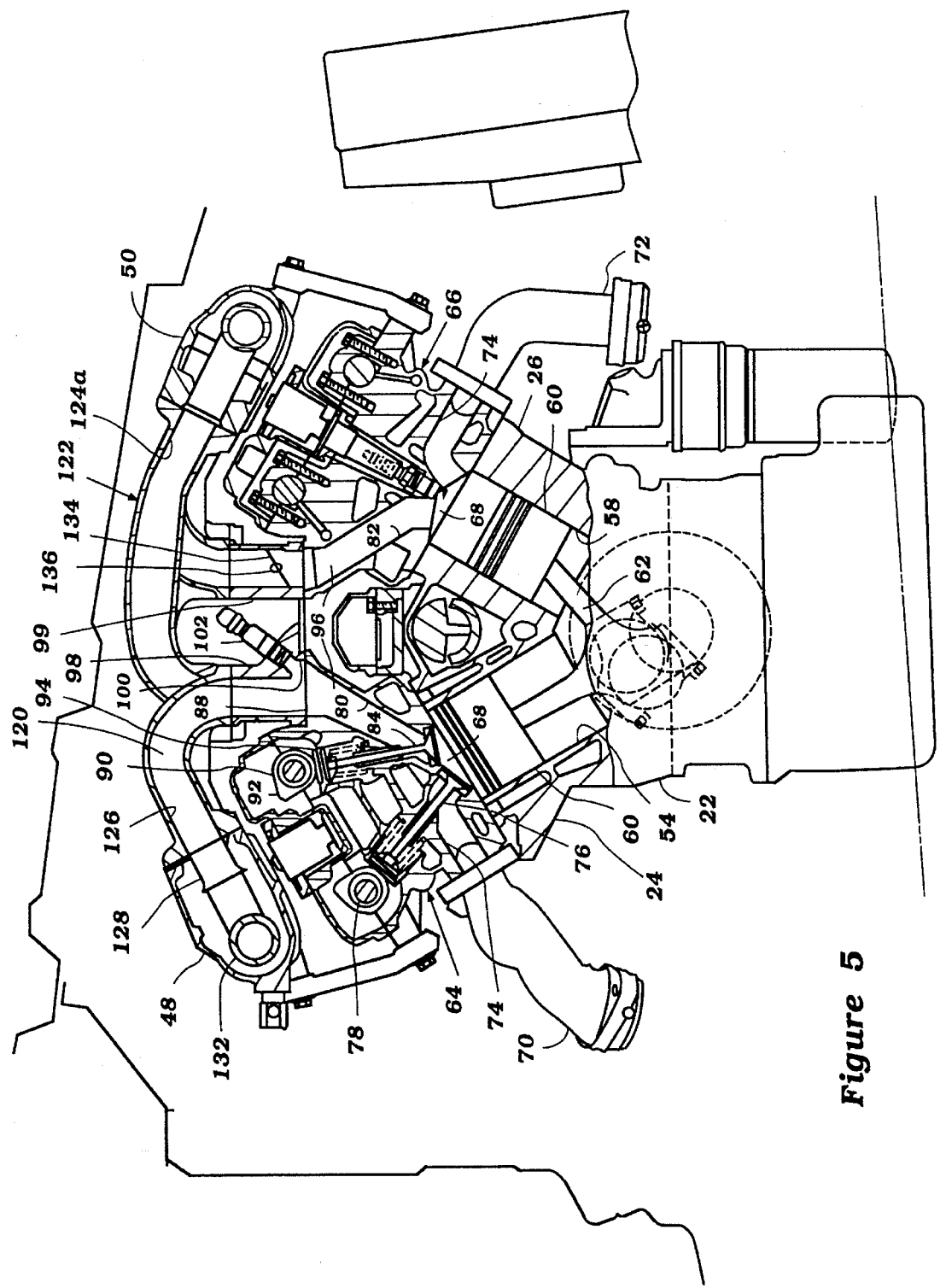
FIG. 5 is an elevational view of the internal combustion engine of FIG. 1 with portions shown in section, taken generally along line 5—5 of FIG. 3.
Figure 6:
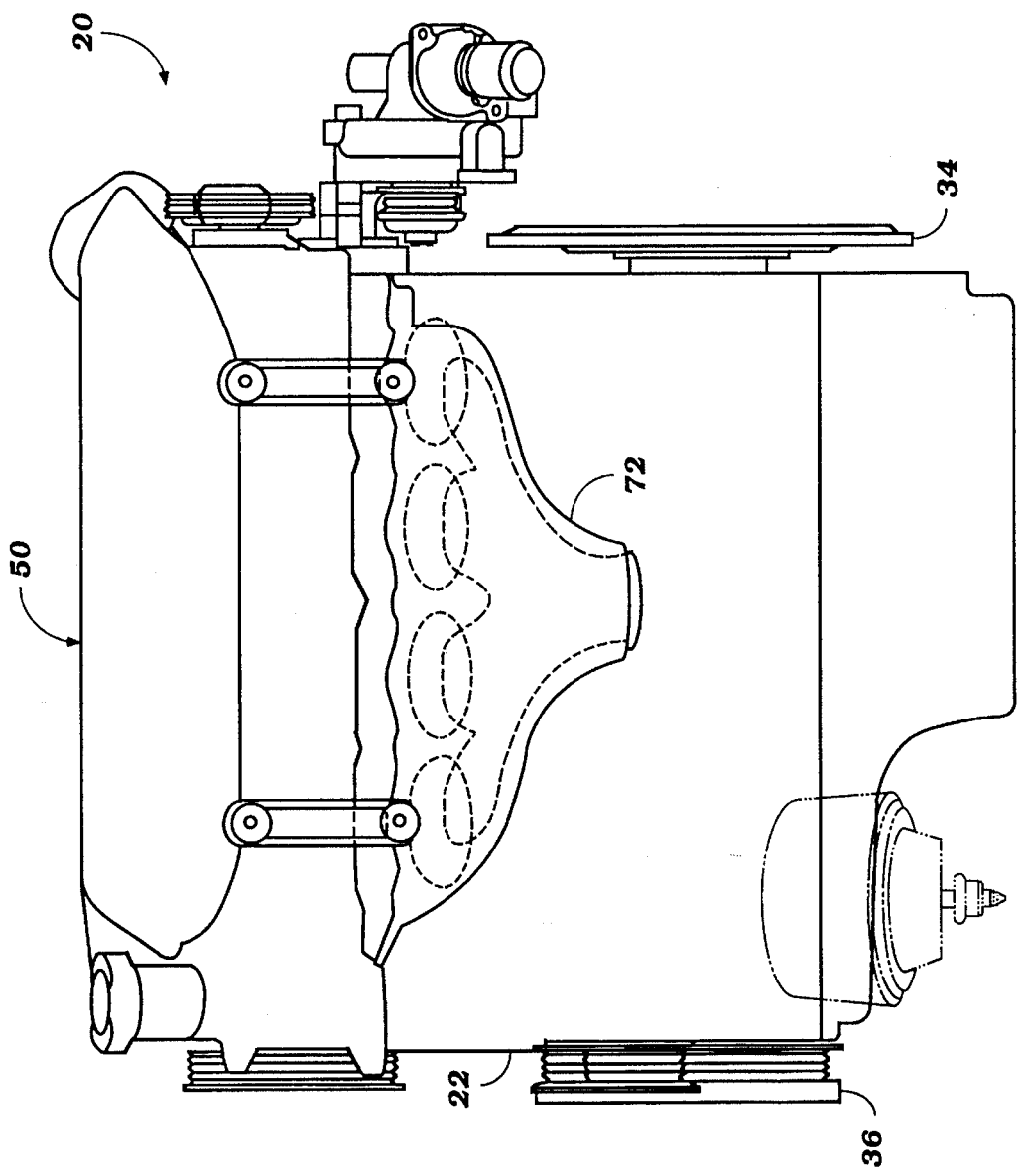
FIG. 6 is a side elevational view of the internal combustion engine of FIG. 1.
Figure 7:
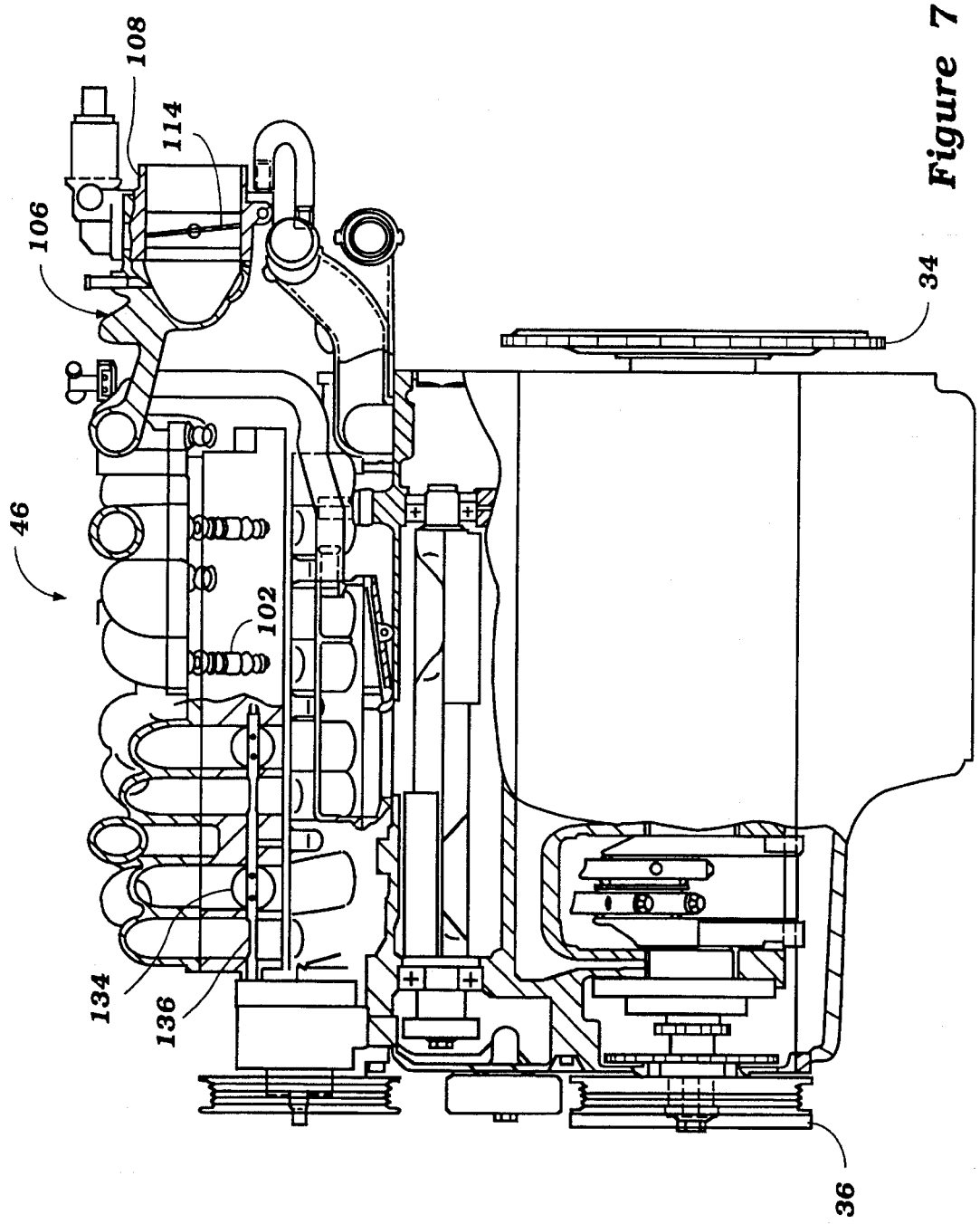
FIG. 7 is a side elevational view of the internal combustion engine of FIG. 1 with portions shown in section, taken generally along line 7—7 of FIG. 3.

The combustion chambers 68 are generally hemispherical in shape, and each chamber is provided with a pair of exhaust passages formed in the respective cylinder head 64 or 66, which extend from the chambers 68 and which are adapted to cooperate with respective exhaust manifolds 70 and 72. These exhaust passages are identified by the reference numeral 74, as shown in FIG. 5. Exhaust valves 76 are reciprocally supported in each of the cylinder heads 64, 66 and control the communication of the cylinder head exhaust passages 74 with the combustion chambers 68. The exhaust valves 76 associated with each cylinder bore 51–58 are operated in unison in a suitable manner, as by means of an overhead-mounted camshaft 78. While the number may vary, there are typically two exhaust valves 76 per cylinder, with the communication ports into the cylinder being located to the exterior side of the hemispherical combustion chamber 68.

On the opposite sides of the hemispherical combustion chamber 68 from the exhaust valves 76, each recess 68 of each cylinder head 64 and 66 is provided with a pair of intake passages 80 and 82. As seen schematically in FIG. 8, with the exhaust ports removed, the passages 80 terminate at an intake valve 84, while the passages 82 terminate at an intake valve 86. The portion of the passages 80, 82 that extend through the respective cylinder heads 64 and 66 are substantially identical in construction, and they each terminate in a generally horizontally extending surface 88 of the cylinder heads.

The intake valves 84, 86 are, like the exhaust valves 76, operated by means of respective overhead-mounted camshafts 90, each supported for rotation in the respective cylinder heads 64 or 66 in a known manner. The intake camshafts 90 have lobes 92 that cooperate with thimble tappets 94 so as to operate the valves 84, 86 in a known manner. Coil compression springs are provided underneath the thimble tappets 94 for urging the valves 84, 86 toward their closed positions. The intake and exhaust camshafts 90 and 78 are driven from the crank shaft of the engine through any suitable drive mechanism, preferably one of the type shown in the co-pending application of Manabu Kobayashi and Yasuo Okamoto, entitled "Camshaft Operating System," attorney docket number YAMAH2.520A, and assigned to the assignee hereof, the disclosure of which is incorporated herein by reference.

As was described in prior U.S. Pat. No. 4,649,876 entitled "Intake Means of Internal Combustion Engine," assigned to the present assignee, the cylinder head intake passages 80, 82 are separated from each other by a boundary wall that extends from the valve seats and for a portion of the length of the passages. However, this wall terminates short of the cylinder head face 88 so as to provide an open area, generally indicated at 96, of limited length through which the passages 80 and 82 may communicate with each other. Just above the horizontal head surface 88, a pair of fuel throttle bodies 98, 99 are mounted, in which a plurality of recesses 100 are formed. A fuel injection nozzle 102 is mounted in a downward direction in each recess 100 for discharging fuel. Because of the central placement and downstream pointing direction, the nozzles 102 provide a good fuel distribution balance between the intake passages 80 and 82.

Figure 4:
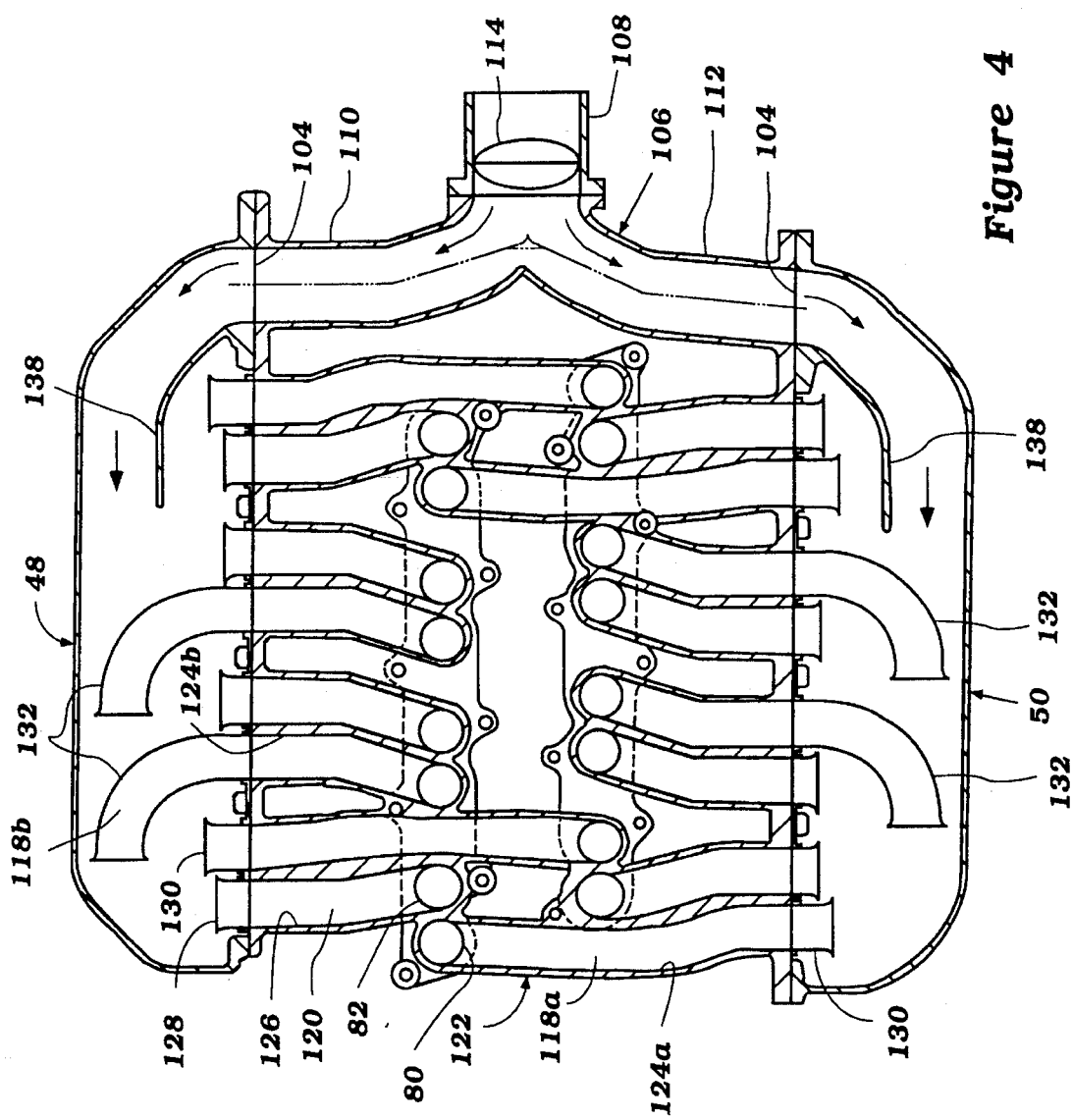
FIG. 4 is a cross-sectional view of the air intake induction system taken generally along the center lines of a plurality of intake conduits.

Now with reference to FIGS. 3–5, the plenum chambers 48, 50 have facing inlet openings 104 at their upstream ends, which receive atmospheric air from an intake device, indicated generally by the reference numeral 106, and which has a generally Y-shape in top plan. The intake device 106 has a common throat portion 108 from which branches 110 and 112 extend to the respective plenum chambers 48, 50. A manually operated throttle valve 114 is supported in the throat 108 and is connected by a suitable linkage 116 to an operator control for controlling the air flow into the induction system 46. A suitable air cleaner (not shown) is typically positioned upstream of the throat 108 for filtering the intake air and for achieving such silencing as may be desired.

As an important feature of the invention, each cylinder 51–58 is served by a primary, relatively long intake passage, indicated generally by the reference number 118 and which includes the cylinder head intake passage 80 and a second, relatively short secondary intake passage, indicated generally by the reference numeral 120, and including the cylinder head intake passage 82. The primary and secondary intake passages 118 and 120 are tuned, respectively, to provide good induction efficiency for low speed and mid-range running and high speed running, respectively, as described in the aforenoted commonly assigned patents. The short secondary intake passages 120, as will be described, extend from each of the cylinder 51 through 58 to the adjacent plenum chamber 48 or 50.

The longer primary intake passageways 118 are arranged in a pair of series some of which extend from each cylinder 51 through 58 to the plenum chamber 48 or 50 disposed above the other cylinder bank, these primary intake passageways of this series being identified by the suffix "a." Another series of primary intake passages extend from the cylinders 51 through 58 to the plenum chamber adjacent the cylinder bank and these primary intake passages are indicated by the suffix "b." By alternating which plenum chamber serves the primary intake passage of the respective cylinder it will be possible to choose a desired firing order, have no two adjacent firing cylinders draw from the same plenum chamber under low and mid-range running conditions, and maintain longer lengths for the primary intake passages 118 than the secondary intake passages 120 while still maintaining a relatively uncomplicated induction system.

In addition to the cylinder head intake passages 80 and 82, the primary and secondary intake passages 118 and 120 are formed by passages formed in the throttle bodies 98 and respective runners formed in an intake manifold, indicated generally by the reference numeral 122 which is affixed to the throttle bodies 98, 99 and the remainder of the engine in a known manner. The primary intake head manifold runners are indicated by the reference numeral 124 while the secondary runners are indicated by the reference numeral 126. The secondary manifold runners 126, as have been noted, are served by the plenum chamber 48 or 50 adjacent the respective cylinder bank 24 and 26 and relatively short trumpets 128 are formed in the plenum chambers 48 and 50 and communicate with these manifold secondary runners 126 to complete the secondary intake passages 120.

Figure 8:
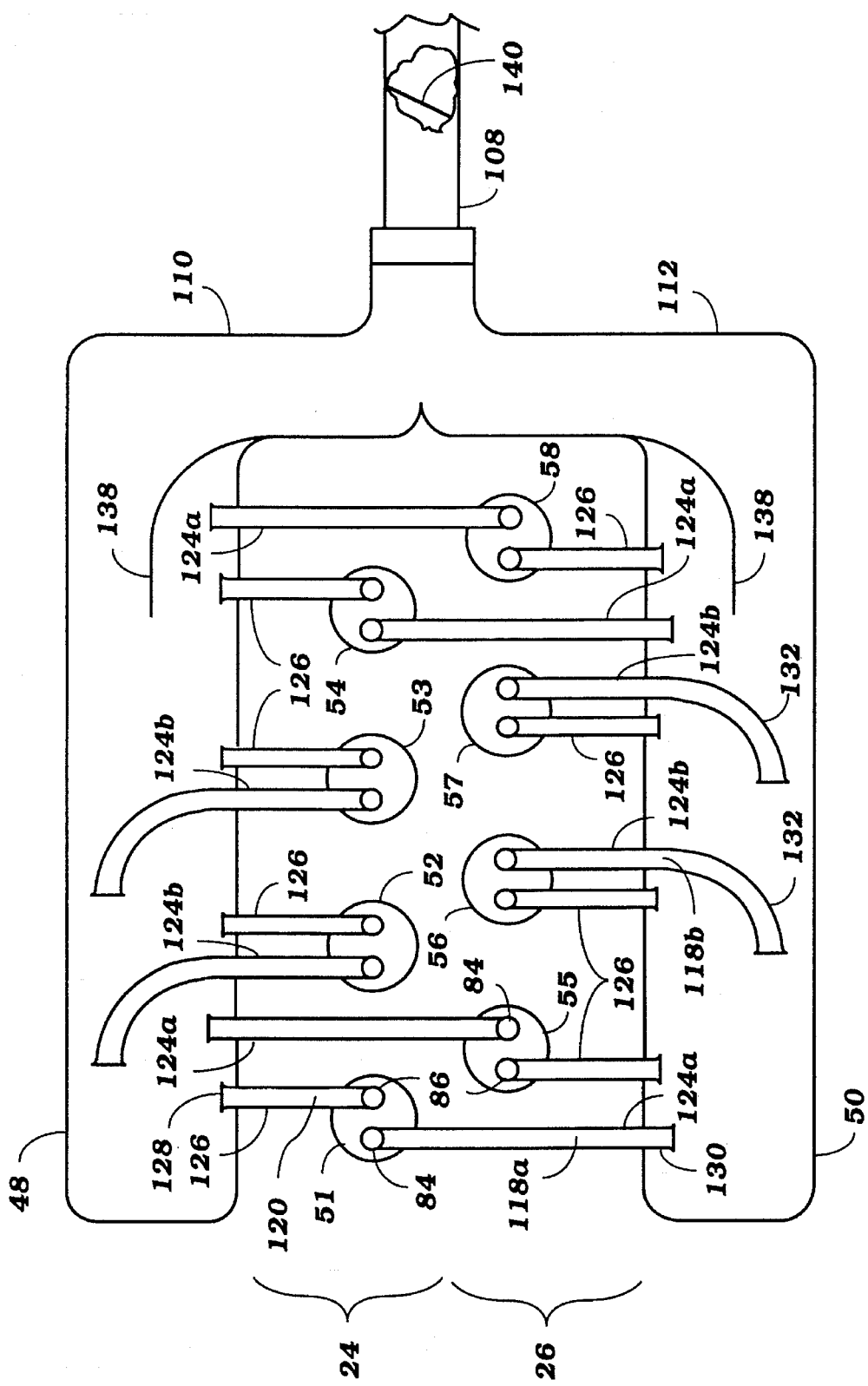
FIG. 8 is a schematic plan view of the air intake induction system of the present invention.

As can be seen in FIG. 8, the primary cylinder head intake passages 80 of the cylinders 51 and 54 of the cylinder bank 24, and of the cylinders 55 and 58 of the cylinder bank 26, are served by the plenum chambers 50 and 48, respectively, of the opposite cylinder banks 26 and 24, respectively. To this end, the intake manifold 122 is provided with long primary runners 124a that extend across the valley between the cylinder banks 24 and 26 and which enter the respective plenum chambers 48 or 50 through relatively short trumpets 130 which trumpets are slightly longer than the secondary trumpets 128. It should be noted that the cylinders served by the plenum chamber of the opposite bank are the end cylinders of each cylinder bank 24 and 26 due to the firing order, as will hereinafter be noted.

Thus, the first series of primary intake passages 118a are comprised of the cylinder head intake passages 80, the short passage through the throttle bodies 98, 99, the manifold runners 124, and the trumpet sections 130. The length of these intake passages is, as noted, substantially longer than that of the secondary intake passages 120 for the reasons aforenoted.

The center cylinders 52 and 53 of the cylinder bank 24 and the center cylinders 56 and 57 of the cylinder bank 26 are served by the adjacent plenum chambers 48 and 50, respectively. To this end, the intake manifold 120 is provided with a second series of primary runners 124b which extend to the adjacent plenum chambers and therein cooperate with relatively long tubular sections 132 which are formed integrally with, or as separate pieces connected to, the respective plenum chambers 48 and 50. These sections 132 are curved so as to provide an increase in their length and are terminated at inlet ends that face away from the inlet openings 104 at the opposite end of the respective plenum chamber 48 and 50. This permits the length of the second series of primary intake passages 118b to be equal to the length of the first series of primary intake passages 118a so as to permit equal tuning lengths.

The flow through the secondary intake passages 120 to the respective cylinders 51 through 58 is controlled by butterfly type throttle valves 134 journalled on throttle valve shafts 136 within the throttle bodies 98, 99. Preferably these throttle valves 134 are disposed above the recesses 100 into which the fuel injectors 102 discharge. The common mounting of the throttle valves 134 in this manner ensures the valves associated with each plenum chamber 48 and 50 will be operated in unison.

At one end of the engine 20, the throttle valve shaft 136 associated with each plenum chamber is extended and connected by means of a linkage system to a vacuum motor. The vacuum motor senses induction system vacuum downstream of the throttle valves 134. The construction and operation of the vacuum motor is such that the throttle valves 134 will be held in their closed position until induction system pressure increases (manifold vacuum decreases), so as to indicate that the engine has approached its maximum power output, or power demand condition. At this point, the valves 134 will be opened and air allowed to flow through the secondary intake passages 120. The short length of the secondary intake passages 120 offers a very low resistance to air flow suitable for the high power demand condition of the engine running at high speeds.

One important aspect of the present invention is the reduction in the external conduit plumbing above the engine 20. Intake air is provided to the cylinders from the plenum chambers 48 or 50 in a manner which enhances performance of the cylinders by substantially avoiding intake pulses drawn from the same plenum chamber successively.

Specific reference is now made to FIGS. 4 and 8, wherein the longitudinal shape of each of the intake passages 118, 120 is shown in cross section. It should be noted that the cross-section of FIG. 4 is taken along an approximate centerline of each of the runners 124, 126, or along two planes extending through each plenum chamber 48, 50, and forming an angle of approximately 120° with each other. Cylinders 51, 54, 55, and 58 each have a relatively straight primary passages 118a extending from the cylinder head intake passage 80 to the opposite plenum chamber, as well as a relatively straight and short secondary passage 120 extending from the cylinder head intake passage 82 to the adjacent plenum chamber. Cylinders 52, 53, 56, and 57, on the other hand, have curvilinear primary passages 118b connected between the cylinder intake passage 80 and the adjacent plenum chamber and relatively straight secondary passages 120 connecting intake passages 82 with the adjacent plenum chamber. The curvilinear shape of the middle cylinder primary passages 118b allows the conduits to terminate within the adjacent plenum chamber without adding substantial external plumbing to the induction system 46. Approximately half of the length of each of the curvilinear primary passages 118b lies within the plenum chambers with the conduits opening up toward the end of the chamber opposite the inlet opening 104.

The total length of all the primary passages 118a,b, whether relatively straight or curvilinear, are approximately equal, resulting in a similar air flow therethrough. As a result, a relatively long air flow path is provided, which gives the opportunity to ensure laminar flow through the induction system so that the passages consisting of the plenum chambers, the primary runners 124, the throttle body 98, 99 passages, and cylinder head intake passages 80 may be tuned so as to give good torque characteristics at low and mid-range running. At higher speeds, the throttle valves 134 will open, and the secondary passages 120 can allow air therethrough into the combustion chambers 68. The passages consisting of the plenum chambers, the secondary runners 126, the throttle body 98, 99 passages, and the cylinder head intake passages 82 are kept very short to permit tuning for maximum power output at high speeds.

To reduce the adverse effects of successively drawing air from one of the two plenum chambers 48, 50, the firing order of the cylinders is such that none of the primary passages 118a,b draw air successively from a single plenum chamber. The beneficial spatial arrangement of the runners 124, 126 is such that it is impossible to avoid pulling air from successive firing of cylinders from one of the two plenum chambers at higher speeds when the throttle valves 134 are opened. However, to reduce any adverse performance effects, at high speeds the firing order is such that there is a minimum of two instances where cylinders firing successively within each eight-cylinder cycle draw air from the same plenum chamber. One preferred firing order is given by the sequence of cylinder firings 51-55-54-52-56-53-57-58. In this sequence, as can be verified from the schematic drawing of FIG. 8, none of the cylinders firing successively draws air through the primary passages 118a,b from the same plenum chamber. However, cylinders 54 and 52 fire successively and, at high speeds, will draw air successively from plenum chamber 48 through their respective secondary passages 120. Likewise, cylinders 57 and 58 fire successively and will draw air from the plenum chamber 50 through their respective secondary passages 120. This situation, in which two out of the eight successive cylinder firings draw air from the same plenum chamber through the secondary conduits at high speeds, is a relatively minor loss in engine power output and is substantially mitigated by the benefits realized by the savings in engine volume from the reduced external plumbing.

The present induction system 46 further incorporates an improved air flow arrangement in which the difference in air flow lengths between the common inlet throat 108 and each of the intake passages 118, 120 is reduced. More particularly, as seen in FIG. 4, each plenum chamber 48, 50 incorporates a baffle 138 extending generally from the inlet openings 104 into the central portion of the chambers. The baffles 138 generally lie parallel to the external surface shape of the plenum chambers 48, 50, and thus initially extend transverse and gradually curve to terminate in a longitudinal direction. The air flow thus enters through the throat 108 and branches 110, 112 into the respective plenum chambers 48, 50 to be channeled into the approximate center of the plenum chambers for subsequent exhaust through one of the trumpets 128, 130, 132 leading to the intake passages 118, 120. This arrangement thus reduces the differences between the air flow lengths serving the passages 118, 120, and thus reduces cylinder-to-cylinder variation.

In addition to having a common throttle valve 114 that controls the flow of intake air to the plenum chambers 48, 50, the induction system 46 is also provided with a single flow sensor 140 (FIG. 8), which may be of the vane type and which senses the air flow into the induction system. This sensor 140 is connected through a suitable control system for controlling the amount of fuel flow delivered to the fuel injection nozzles 102. The specific construction for controlling the fuel flow may be of any known type but preferably includes the serpentine fuel rail 130, shown in FIG. 3, and aforementioned fuel pump pulley 40 and associated fuel pump.

The operation of the induction system 46 will now be described. During low speed running, the manually operated common throttle valve 114 will be actuated under the operator's control and will be opened only to a small degree. There will be a relatively high induction system vacuum exerted on the vacuum motors, so as to hold the throttle valves 134 in their closed positions. Hence, substantially all the induction air for the engine will be supplied through the inlet device 106 to the plenum chambers 48 and 50, and specifically to their outlets leading to the constantly open primary passages 118a,b. The air is transferred from the plenum chambers 48, 50 through the relatively long intake passages 118 to the combustion chambers 68. Hence, as has already been noted, a relatively long air path is provided that will ensure laminar flow. However, the air will flow through a relatively small cross-sectional area of the total induction system area serving each cylinder bore 51–58 so that the induction will be at a high velocity. This will ensure a rapid rate of flame propagation in the chambers, which ensures that there will be good combustion.

As the load on the engine increases and the manually operated throttle valve 114 is progressively opened, there will be a point when the intake passages 118a,b cannot supply the full charge requirements of the combustion chamber 68. This occurs at a point before that at which the throttle valves 134 are opened. At this point, induction charge may flow through the communicating area 96 to enter the chamber 68 through both the cylinder head intake passages 80 and 82 and past both intake valves 84 and 86. As has been previously noted, this communication provides significantly improved mid-range performance, since it eliminates or substantially reduces the dip that would otherwise occur in the torque curve of the engine at this point.

As the load continues to increase and the throttle valve 114 is progressively opened, the induction system vacuum will eventually reach a point where the vacuum motor no longer holds the control valves 134 in their closed position, and these valves will open. Thus, the effective area of the induction system serving each cylinder bore 51–58 will substantially increase, and a very good maximum output can be achieved. Furthermore, as has been noted, the intake passages 120 are relatively short and will offer low flow resistance and may be tuned so as to achieve the desired flow under this running condition.

It should be readily apparent that the described construction permits good induction efficiency and cylinder charging under all running conditions. In addition, the use of the two plenum chambers 48 and 50 provide a large volume, which ensures good distribution and reduces induction system noise. By employing the two spaced-apart boxes, it is possible to obtain a relatively low hoodline, as indicated in FIGS. 1 and 2. Furthermore, the configuration permits the use of separately tuned induction passages for each cylinder in a compact area. The volume of the associated external plumbing of the induction system is further reduced by the provision of the curvilinear runners 124b extending within the plenum chambers 48, 50. This arrangement provides an equally long air flow path to each cylinder 51–58 without requiring that the primary passages 118 extend to the opposing plenum chamber for each cylinder. Additionally, as has been noted, the plenum chambers are mounted substantially parallel to the upper surfaces of the cam covers, so that the profile of the engine is still further reduced, as seen in FIGS. 1 and 2. The present internal combustion engine thus enjoys the benefits of the improved induction system described and can be constructed in a substantially smaller volume to allow hoodlines to be lowered, providing further flexibility to the auto body designer.

Although an embodiment of the invention has been illustrated and described, various changes and modifications may be made, without departing from the spirit and scope of the invention, as defined by the appended claims.

We claim:

1. An induction system for an internal combustion engine having a pair of angularly disposed cylinder banks each having at least two cylinders for a total of N cylinders, first and second plenum chambers each juxtaposed to a respective one of said cylinder banks, a first series of first intake passages, each of said first intake passages extending from each of said cylinders to the juxtaposed plenum chamber, a second series of second intake passages of a number less than the number of cylinders, each of said second intake passages extending from a first number n of said cylinders to the juxtaposed plenum chamber, and a third series of third intake passages, each of said third intake passages extending from the remainder (N–n) of said cylinders to the nonjuxtaposed plenum chamber.

2. The induction system as set forth in claim 1, wherein the second and third intake passages each have the same length.

3. The induction system as set forth in claim 2, wherein the length of the first intake passages is different from the lengths of the second and third intake passages.

4. The induction system as set forth in claim 3, wherein the first intake passages are shorter than the second and third intake passages.

5. The induction system as set forth in claim 4, wherein the second intake passages extend for a substantial length into the juxtaposed plenum chamber.

6. The induction system as set forth in claim 2, wherein the second intake passages extend for a substantial length into the juxtaposed plenum chamber.

7. The induction system as set forth in claim 6, further including an atmospheric air inlet at one end of each of said plenum chambers.

8. The induction system as set forth in claim 7, wherein the ends of the second intake passages face away from the atmospheric air inlets of the juxtaposed plenum chambers.

9. The induction system as set forth in claim 8, wherein the atmospheric air inlets of the plenum chambers are at the same end of the engine and are served by a common atmospheric air intake device in which a single throttle valve is positioned.

10. The induction system as set forth in claim 7, wherein conduit means extend from the atmospheric air inlets of the plenum chambers to a point disposed substantially centrally of the length of the respective plenum chamber.

11. The induction system as set forth in claim 10, wherein the ends of the second intake passages face away from the atmospheric air inlets of the juxtaposed plenum chambers.

12. The induction system as set forth in claim 11, wherein the atmospheric air inlets of the plenum chambers are at the same end of the engine and are served by a common atmospheric air intake device in which a single throttle valve is positioned.

13. The induction system as set forth in claim 1, wherein the cylinders of the engine fire in an order such that each plenum chamber does not serve a successively firing cylinder through the second and third series of intake passages.

14. The induction system as set forth in claim 13, wherein the second and third intake passages each have the same length.

15. The induction system as set forth in claim 14, wherein the length of the first intake passages is different from the lengths of the second and third intake passages.

16. The induction system as set forth in claim 15, wherein the first intake passages are shorter than the second and third intake passages.

17. The induction system as set forth in claim 16, wherein the second intake passages extend for a substantial length into the juxtaposed plenum chambers.

18. The induction system as set forth in claim 17, further including an atmospheric air inlet at one end of each of said plenum chambers.

19. The induction system as set forth in claim 18, wherein the ends of the second series of intake passages face away from the atmospheric air inlets of the adjacent plenum chamber.

20. The induction system as set forth in claim 19, wherein the atmospheric air inlets of the plenum chambers are at the same end of the engine and are served by a common atmospheric air intake device in which a single throttle valve is positioned.

21. The induction system as set forth in claim 20, wherein conduit means extend from the atmospheric air inlets of the plenum chambers to a point disposed substantially centrally of the length of the respective plenum chamber.

22. The induction system as set forth in claim 21, wherein the cylinder banks are disposed at a V angle and each cylinder bank is covered by a cam cover having an upper surface that extends generally at an acute angle to a horizontal plane perpendicular to a vertical plan passing through the center of the V and wherein the plenum chambers have lower surfaces that extend substantially parallel to the upper surface of the adjacent cam cover for maintaining a low overall height for said engine.

23. The induction system as set forth in claim 13, wherein the cylinder banks are disposed at a V angle and each cylinder bank is covered by a cam cover having an upper surface that extends generally at an acute angle to a horizontal plane perpendicular to a vertical plan passing through the center of the V and wherein the plenum chambers have lower surfaces that extend substantially parallel to the upper surface of the adjacent cam cover for maintaining a low overall height for said engine.

24. The induction system as set forth in claim 1, wherein the cylinder banks are disposed at a V angle and each cylinder bank is covered by a cam cover having an upper surface that extends generally at an acute angle to a horizontal plane perpendicular to a vertical plan passing through the center of the V and wherein the plenum chambers have lower surfaces that extend substantially parallel to the upper surface of the adjacent cam cover for maintaining a low overall height for said engine.

25. The induction system as set forth in claim 24, wherein the second and third intake passages each have the same length.

26. The induction system as set forth in claim 25, wherein the length of the first intake passages is different from the lengths of the second and third intake passages.

27. The induction system as set forth in claim 26, wherein the first intake passages are shorter than the second and third intake passages.

28. The induction system as set forth in claim 27, wherein the second intake passages extend for a substantial length into the juxtaposed plenum chamber.

29. The induction system as set forth in claim 28, further including an atmospheric air inlet at one end of each of said plenum chambers.

30. The induction system as set forth in claim 29, wherein the ends of the second intake passages face away from the atmospheric air inlets of the juxtaposed plenum chambers.

31. The induction system as set forth in claim 30, wherein the atmospheric air inlets of the plenum chambers are at the same end of the engine and are served by a common atmospheric air intake device in which a single throttle valve is positioned.

32. The induction system as set forth in claim 31, wherein conduit means extend from the atmospheric air inlets of the plenum chambers to a point disposed substantially centrally of the length of the respective plenum chamber.

33. The induction system as set forth in claim 1, wherein each cylinder bank has at least four cylinders ($N \geq 8$).

34. The induction system as set forth in claim 33, wherein the cylinder banks are disposed at a V angle to each other.

35. The induction system as set forth in claim 34, wherein each cylinder has two intake valves, one of said intake valves being served by a one of the first intake passages and the other of the intake valves being served by one of either the second or the third intake passages.

36. The induction system as set forth in claim 35, wherein the second and third intake passages each have the same length.

37. The induction system as set forth in claim 36, wherein the length of the first intake passages is different from the lengths of the second and third intake passages.

38. The induction system as set forth in claim 37, wherein the first intake passages are shorter than the second and third intake passages.

39. The induction system as set forth in claim 35, wherein the cylinders of the engine fire in an order such that each plenum chamber does not serve a successively firing cylinder through the second and third series of intake passages.

40. The induction system as set forth in claim 39, wherein the second and third intake passages each have the same length.

41. The induction system as set forth in claim 40, wherein the length of the first intake passages is different from the lengths of the second and third intake passages.

42. The induction system as set forth in claim 41, wherein the first intake passages are shorter than the second and third intake passages.

43. The induction system as set forth in claim 42, wherein the second intake passages extend for a substantial length into the juxtaposed plenum chamber.

44. An induction system for an internal combustion engine having a plurality of cylinders aligned in a bank, a plenum chamber having an atmospheric air inlet at one end thereof, a plurality of inlet passages extending from said cylinders into said plenum chamber and opening therein at positions spaced along its length, and means forming an internal duct in said plenum chamber extending from said atmospheric air inlet to a point in said plenum chamber substantially at the center of the openings on said inlet passages in said plenum chamber.

45. The induction system as set forth in claim 44, wherein the inlet passages each terminate at a side wall of the plenum chamber.

46. The induction system as set forth in claim 45, further including a further series of inlet passage opening into said plenum chamber.

47. The induction system as set forth in claim 46, wherein certain of the further series of inlet passages extend from the same cylinders as the first mentioned plurality of inlet passages.

48. The induction system as set forth in claim 7, wherein the certain of said further series of inlet passages extend for a substantial length into the plenum chamber.

49. The induction system as set forth in claim 48, wherein the certain of the further series of inlet passages face away from the end of the internal duct.

50. The induction system as set forth in claim 49, wherein the remaining of the further series of inlet passages serve cylinders of another bank of cylinders of the engine and terminate in the side wall of the plenum chamber.

51. An induction system for a V-type engine having a pair of cylinder banks disposed at a V angle to each other, said cylinder banks each having a cam cover associated therewith with the upper surfaces of said cam covers lying at acute angles to a horizontal plane perpendicular to a vertical plane bisecting the V angle between said cylinder banks, a pair of plenum chambers each extending along the upper surface of a respective one of said cam covers and having a lower surface extending substantially parallel to and along substantially the entire width of the upper surface of said cam covers for maintaining a low profile for said engine, and intake passages extending from said cylinders into said plenum chambers for charging said cylinders.

52. The induction system for a V-type engine as set forth in claim 51, further including an atmospheric air inlet at one end of each of said plenum chambers.

53. The induction system for a V-type engine as set forth in claim 52, wherein the plenum chamber atmospheric air inlets are at the same end of the engine and are served by a common atmospheric air induction device.

54. The induction system for a V-type engine as set forth in claim 53, wherein the common atmospheric air induction device has a single throttle valve for controlling the air flow to each of said plenum chambers.

55. The induction system for a V-type engine as set forth in claim 51, wherein each cylinder of the engine has a first intake passage extending from the cylinder to the adjacent plenum chamber and a second intake passage, said second intake passages of certain of said cylinders extending to the adjacent plenum chamber and the remaining of said second inlet passages extending to the plenum chamber adjacent the other cylinder bank.

56. The induction system for a V-type engine as set forth in claim 55, wherein the second series of intake passages all have the same length.

57. The induction system for a V-type engine as set forth in claim 56, wherein the length of the second intake passages is greater than the length of the first intake passages.

58. The induction system for a V-type engine as set forth in claim 57, further including an atmospheric air inlet at one end of each of said plenum chambers.

59. The induction system for a V-type engine as set forth in claim 58, wherein the plenum chamber atmospheric air inlets are at the same end of the engine and are served by a common atmospheric air induction device.

60. The induction system for a V-type engine as set forth in claim 59, wherein the common atmospheric air induction device has a single throttle valve for controlling the air flow to each of said plenum chambers.

61. The induction system for a V-type engine as set forth in claim 51, wherein the upper surfaces of the plenum chambers also extend substantially parallel to the upper surface of the cam covers.

62. An induction system for a V-type engine as set forth in claim 51, further including means formed at the outer sides of the cylinder banks for providing support for the outer ends of the respective plenum chambers.

* * * * *